W. W. HAMILL.
LIQUID METER.
APPLICATION FILED NOV. 5, 1914.
1,221,726.
Patented Apr. 3, 1917.
4 SHEETS—SHEET 1.
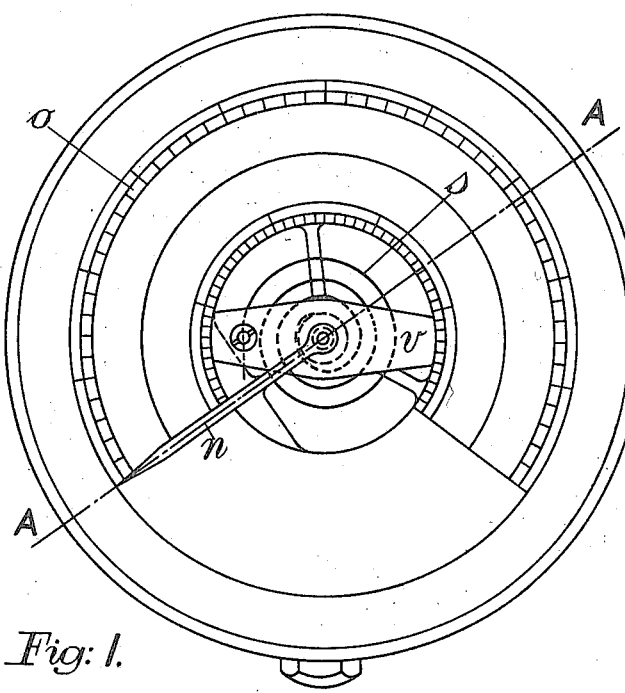
Fig: 1.
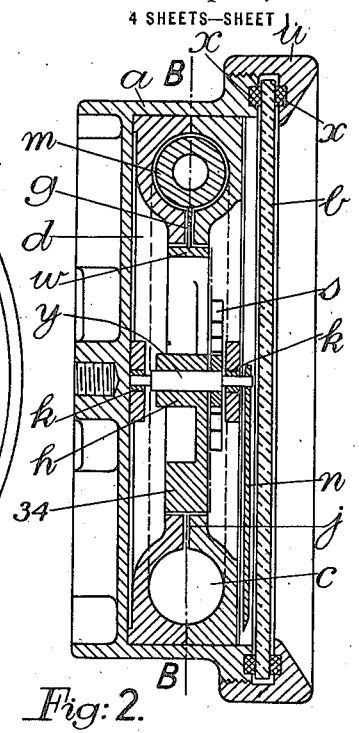
Fig: 2.
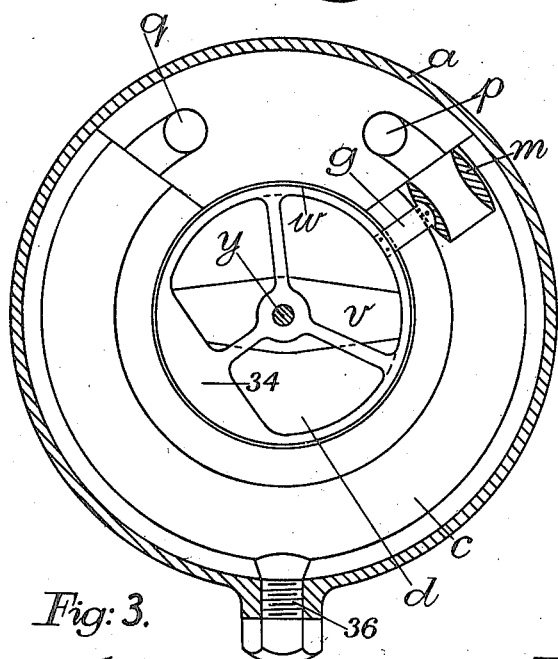
Fig: 3.
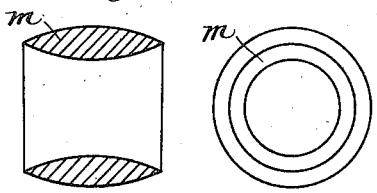
Fig: 4. Fig: 5.
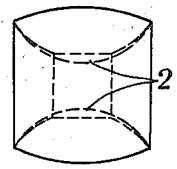 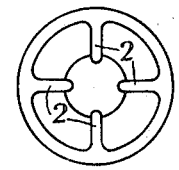
Fig: 6. Fig: 7.
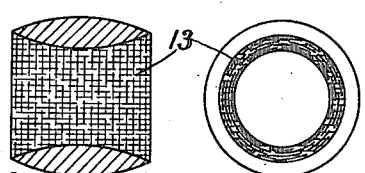
Fig: 8. Fig: 9.
Witnesses
Floyd R Cornwall
F. M. Meyer
Inventor
W. W. Hamill
By Geo Irwin Atty.

W. W. HAMILL.
LIQUID METER.
APPLICATION FILED NOV. 5, 1914.
1,221,726.
Patented Apr. 3, 1917.
4 SHEETS—SHEET 2.
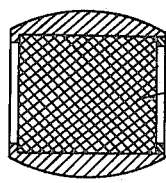
Fig: 10.   Fig: 11.
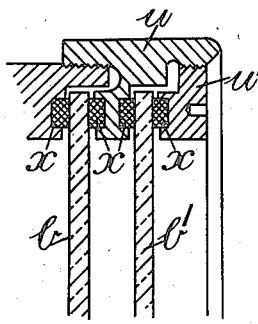
Fig: 12.
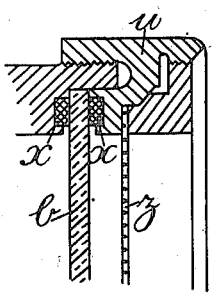
Fig: 13.
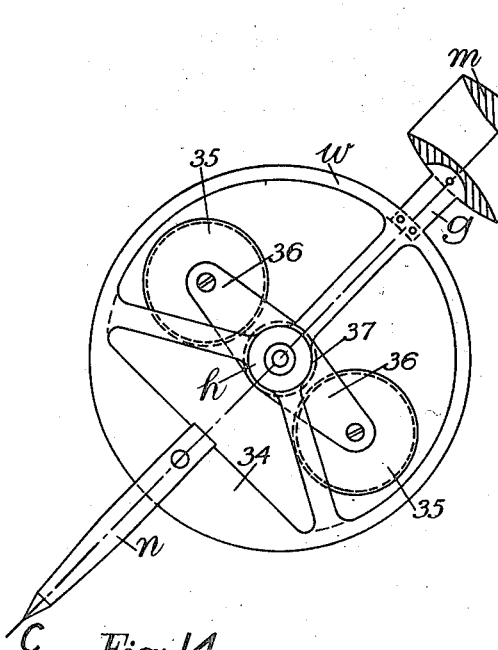
Fig: 14.
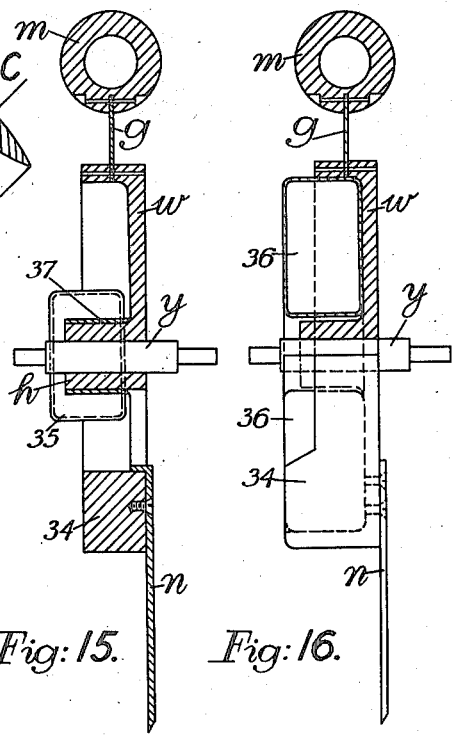
Fig: 15.   Fig: 16.
Witnesses
Floyd R Cornwall
J. M. Meyer
Inventor
W. W. Hamill
By Geo. C. Imirie
Atty.

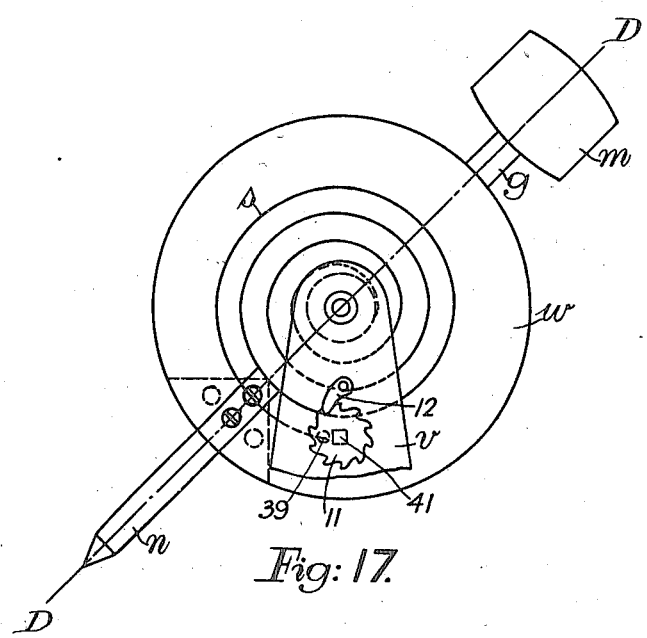
Fig: 17.
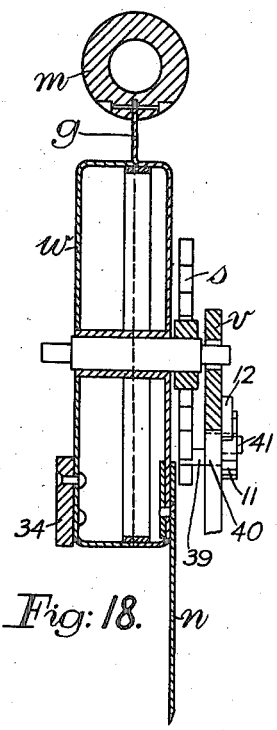
Fig: 18.
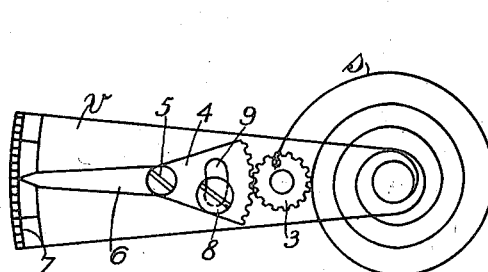
Fig: 19.
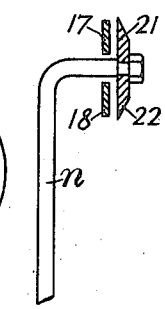
Fig: 20.
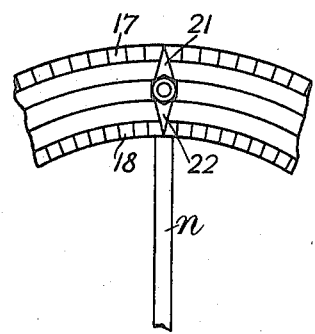
Fig: 21.

W. W. HAMILL.
LIQUID METER.
APPLICATION FILED NOV. 5, 1914.

1,221,726.

Patented Apr. 3, 1917.
4 SHEETS—SHEET 4.

Witnesses

Inventor
W. W. Hamill
By
Atty.

UNITED STATES PATENT OFFICE.

WILLIAM WILSON HAMILL, OF GLASGOW, SCOTLAND.

LIQUID-METER.

1,221,726.  Specification of Letters Patent.  Patented Apr. 3, 1917.

Application filed November 5, 1914. Serial No. 870,494.

*To all whom it may concern:*

Be it known that I, WILLIAM WILSON HAMILL, a subject of the King of Great Britain and Ireland, residing at 94 Hope street, Glasgow, Scotland, have invented certain new and useful Improvements in Liquid-Meters; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to apparatus for measuring and indicating the flow of liquids, and is specially suitable for measuring the consumption of liquid fuel by internal combustion engines and liquid fuel burners (*e. g.*, in steam generators).

Liquids have heretofore been measured by means of vanes, weighted throttle valves and the like which are arranged to obstruct the flow of the liquid and to be displaced by the momentum of the latter so as to enlarge the area for the flow of the liquid. Such devices are, in my opinion, unsatisfactory for the purposes for which my invention is intended, as they involve difficulties as regards standardization and graduation.

The essential feature of my invention is the employment of a movable annular vane which is so constructed and located in or around the path of the liquid that the latter when in motion passes through the said vane and, in doing so, acts on it frictionally so as to displace it to a degree depending on the frictional force exerted and hence on the velocity of flow of the liquid.

My invention will be described in the following specification and more particularly defined in the annexed claims.

The accompanying drawings illustrate meters and parts of meters according to my invention.

Figure 1 is a front elevation of one convenient form of meter.

Fig. 2 is a section of the same on the line A A of Fig. 1.

Fig. 3 is a section of the same on the line B B of Fig. 2.

Figs. 4 and 5 are respectively longitudinal section and end elevation of a vane such as that employed in the instrument illustrated in Figs. 1–3, but of slightly different proportions.

Figs. 6 and 7 are respectively side elevation and end elevation of a modified construction of vane.

Figs. 8 and 9 are respectively longitudinal section and end elevation of a further modified construction.

Figs. 10 and 11 are respectively longitudinal section and end elevation of a further modified construction.

Fig. 12 is a detail section through an alternative arrangement of cover.

Fig. 13 is a detail section through an alternative arrangement of cover.

Fig. 14 is a front elevation (with the vane in section) of an alternative construction of moving parts.

Fig. 15 is a section on the line C C of Fig. 14.

Fig. 16 is a sectional view partly in elevation corresponding to Fig. 15 and illustrates an alternative construction.

Fig. 17 is a detail elevation of a modified form of the device illustrating a spring connection and adjustment.

Fig. 18 is a section on the line D—D of Fig. 17.

Fig. 19 illustrates an alternative spring adjustment device.

Figs. 20 and 21 are respectively a side elevation partly in section and front elevation of an alternative arrangement of index and scale.

Figure 23:
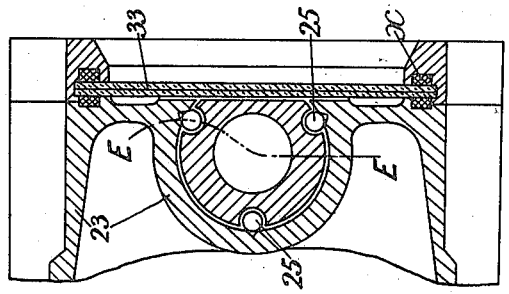
Fig. 23 is a cross section of the same.

Referring to Figs. 1, 2 and 3, $a$ is a flat cylindrical case closed on one side by the glass lid $b$. The case includes two chambers—a main chamber $d$ and an arc-shaped chamber or channel $c$ which is concentric with the circumference of the case and communicates at its ends with the exterior of the case by means of ports $p$, $q$. Within the main chamber of the case is a wheel $w$, the boss $h$ of which is mounted on a pin $y$ pivoted in bearings $k$, $k$ within the case. Within the channel $c$ is a vane $m$ which is supported on the arm $g$ carried by the wheel so as to be able to move within the channel without touching the sides of the latter, the axis of rotation of the arm being coincident with the center of the circle which forms the axis of the channel. The vane is of annular or tubular converging-diverging form, its axis coinciding with the center line of the channel. The pin $y$ carries an index finger $n$ which is adapted to work over a scale $o$ engraved on or attached to the case $a$.

One end of a spring $s$ is attached to the pin $y$ while the other end is attached to the bridge piece $v$. The spring tends to keep the arm, vane, and index in the position in which the index is opposite the zero point on the scale.

The meter is connected up in the path of flow of the liquid which it is desired to measure, the liquid being caused to enter the instrument at the port $p$ and to leave it at the port $q$ after traversing the channel $c$.

The fluid in flowing through the channel acts frictionally on the vane $m$ so as to displace this vane in the line of flow of the liquid and against the action of the spring $s$. The amount of displacement of the vane depends on the velocity of flow of the liquid—and of course also on the viscosity or frictional drag of the liquid—and consequently the position of the index finger is a measure of the rate of flow of the liquid through the instrument.

The liquid flows both through and around the vane, but it is preferred to so construct the channel and vane that the chief flow of the liquid is through the vane and only a small leakage takes place around the exterior of the vane.

The slit $j$ connects the main chamber $d$ with the channel $c$. The arm $g$ extends through this slit. The slit allows liquid to pass from the channel $c$ to the main chamber $d$ and thus to fill the main chamber; but the opportunity afforded the liquid of short-circuiting through the chamber $d$ is small as, not only is the slit $j$ very narrow, but the circumference of the wheel $w$ lies closely within the surfaces of the case.

34 is a balance weight to counterbalance the weight of the vane.

The instrument can be drained when desired by removing the plug 36.

The construction of the vane may be modified as may be found desirable to suit the quantity, nature, or velocity of the fluid to be measured. Various constructions are shown in Figs. 4–11.

The design shown in Figs. 4 and 5 is of the same nature as that shown in Figs. 1–3, the proportions only being slightly different. In the construction shown in Figs. 6 and 7 ribs 2 are formed on the interior of the vane. In the construction shown in Figs. 8 and 9, the interior surface 13 is roughened. In the construction shown in Figs. 10 and 11 wire gauze 14 is coiled up inside the vane.

In Figs. 1 and 2 a glass cover $b$ is shown which is secured to the case by a ring $u$ which is screwed to the case, packing rings $x$, $x$ being employed to keep the case fluid tight. Celluloid or other transparent material or combination of materials may be employed in place of glass. (Duplex or composite glass is shown in Fig. 23.)

Fig. 12 shows an alternative construction of cover, two independent sheets of glass $b$, $b'$ being employed, the first held down by the ring $u$ and the second by the ring $u'$.

Fig. 13 shows another arrangement, $b$ being a glass cover and $z$ a cover of wire gauze or the like.

The liquid in the main chamber $d$ and in the slit $j$, by its frictional drag on the wheel $w$ and arm $g$, serves to damp the oscillations of the vane, but special means may be provided to increase this damping effect.

For example, in the construction shown in Figs. 14 and 15, cylindrical bodies 35 are mounted on arms 36 carried by a sleeve 37 which is mounted on the boss $h$ of the wheel $w$. These bodies by the friction and eddies they produce when moved through the liquid assist in damping the vibrations. Any desired number of dampers may be employed and these may be of any desired shape and arranged in any desired manner.

These dampers may advantageously be employed for another purpose, namely to assist in the support of the rotating parts. For example, the dampers 35 in Figs. 14 and 15 are hollow and of less specific gravity than the liquid, so that they have a buoyant action, and wholly or partly support the weight of the moving parts so reducing bearing friction.

An alternative construction is shown in Fig. 16 in which the dampers 36 are directly carried by the wheel. A further alternative construction is shown in Figs. 17 and 18 in which the whole wheel is made hollow.

In the constructions shown in Figs. 14–18 the pointer $n$ is directly attached to the wheel. The wheel, pointer, and arm $g$ may give sufficient damping effect, and in the constructions shown in Figs. 17 and 18 no special damping means are provided.

Means may be provided for conveniently adjusting the tension of the spring $s$. In Fig. 17 the spring is attached to a pin 39 eccentrically arranged on a pin 40 which passes through the bridge-piece $v$ and has a square end 41 on which is mounted a ratchet wheel 11 with which engages a pawl 12. By turning the ratchet wheel by hand the spring can be adjusted.

An alternative arrangement is shown in Fig. 19. In this case the end of the spring is attached to the pinion 3 which meshes with the toothed segment 4. This segment is pivoted at 5 to the bridge-piece *v* and is provided with an index 6 which works over a scale 7. A pin 8 which passes through a slot 9 in the segment is employed to clamp the segment in any desired position. By means of the segment the pinion 3 can be rotated and the tension of the spring consequently adjusted as desired. Moreover, the index 6 indicates the tension of the spring.

Figs. 20 and 21 are respectively a partly sectional side elevation and a front elevation of an alternative arrangement of index. In this case two scales 17 and 18 are employed. The pointer *n* comes up behind the scales, passes through between them, and is provided in front of the scales with two index fingers 21, 22 which act in conjunction with the scales 17 and 18 respectively. The two scales may be differently graduated. For example, one may indicate gallons per minute and the other liters per minute.

Figure 22:
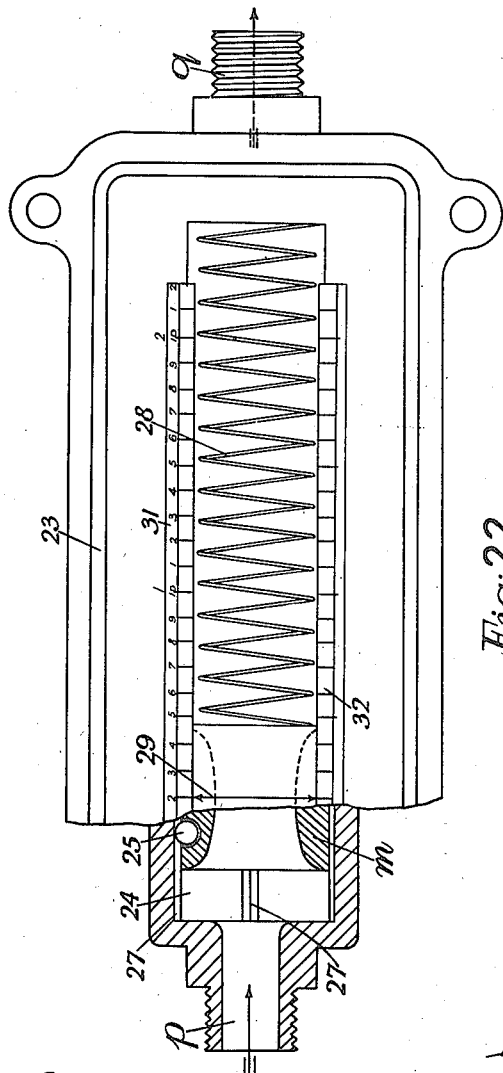
Fig. 22 is a front elevation partly in section on the line E E of Fig. 23 of a meter in which the vane is arranged to have a straight line movement.

Figs. 22 and 23 show a liquid meter according to my invention in which the movement of the annular vane is arranged to be in a straight line instead of in an arc of a circle. The case 23 contains a single chamber or straight channel 24. Fluid is caused to enter and leave the chamber by the ports *p* and *q* respectively. Within the chamber is provided a vane *m* which is of substantially the same nature as hereinbefore described and acts in substantially the same manner, except that it is not supported on an arm, but is carried on balls 25 which run in grooves 27 provided in the sides of the channel. A spring 28 serves to press the vane against that end of the chamber at which liquid enters. The flow of liquid through the channel tends to force the vane toward the other end of the channel against the action of the spring. A line 29 provided on the vane registers with a scale or scales 31, 32 provided on the transparent cover 33 of the instrument; or the scales may be engraved on metal plates or the like which are placed inside or outside the cover.

It will be obvious that in both types of instrument, that is, the swinging vane type and the linear motion type, the design and construction of the instrument may be modified without departing from my invention.

Having thus described my invention what I claim as new and desire to secure by Letters Patent is:—

1. A meter for the measurement of liquids comprising a case, a channel within said case adapted for the flow of liquid through it, an annular vane supported in said channel with its axis coincident with the axis of the channel whereby the liquid can flow through the said vane and by frictional force due to the flow displace the vane axially within said channel, the liquid passage remaining of constant area in all positions of the vane, means for resisting the displacement of said vane, and means for indicating the displacement of said vane.

2. A meter for the measurement of liquids comprising a case divided into two chambers, namely a channel adapted for the flow through it of the liquid to be measured and a main chamber, means to flood the main chamber with the liquid to be measured, an annular vane supported in said channel with its axis coincident with the axis of the channel whereby the liquid can flow through said vane, and by frictional force due to the flow displace the vane axially within said channel, means for resisting the displacement of said vane, a damper attached to said vane and located in said main chamber, and means for indicating the displacement of said vane.

3. A meter for the measurement of liquids comprising a case divided into two chambers, namely a channel adapted for the flow through it of the liquid to be measured and a main chamber, means to flood the main chamber with the liquid to be measured, an annular vane supported in said channel with its axis coincident with the axis of the channel whereby the liquid can flow through said vane, and by frictional force due to the flow displace the vane axially within said channel, means for resisting the displacement of said vane, a buoyant damper attached to said vane and of less specific gravity than the liquid to be measured, said damper being located in said main chamber, and means for indicating the displacement of said vane.

4. A meter for the measurement of liquids comprising a case, a channel within said case adapted for the flow of liquid through it, an annular vane supported in said channel with its axis coincident with the axis of the channel whereby the liquid can flow through the said vane and by frictional force due to the flow displace the vane axially within said channel, a spring resisting the displacement of the said vane, one end of said spring being connected to said vane, a member attached to the other end of said spring, means for adjusting said member, means for indicating the position of adjustment of said member, and means for indicating the displacement of said vane.

5. A meter for the measurement of liquids comprising a case divided into two chambers, namely a channel adapted for the flow through it of the liquid to be measured and a main chamber, means to flood the main chamber with the liquid to be measured, an annular vane supported in said channel with its axis coincident with the axis of the channel whereby the liquid can flow through the said vane and by frictional force due to the flow displace the vane axially within said channel, a spring resisting the displacement of the said vane, one end of said spring being connected to said vane, a member attached to the other end of said spring, means for adjusting said member, means for indicating the position of adjustment of said member, a damper attached to said vane and located in said main chamber, and means for indicating the displacement of said vane.

In testimony whereof I have signed my name to this specification in the presence of two subscribing witnesses.

WILLIAM WILSON HAMILL.

Witnesses:
ROBERT WOLINE,
JENNY RANKIN.